United States Patent [19]

Bikson et al.

[11] Patent Number: 5,356,459
[45] Date of Patent: Oct. 18, 1994

[54] PRODUCTION AND USE OF IMPROVED COMPOSITE FLUID SEPARATION MEMBRANES

[75] Inventors: Benjamin Bikson, Brookline; Joyce K. Nelson, Lexington, both of Mass.

[73] Assignee: Praxair Technology, Inc., Danbury, Conn.

[21] Appl. No.: 83,604

[22] Filed: Jun. 30, 1993

[51] Int. Cl.$^5$ .................. B01D 53/22; B01D 69/08; B01D 71/70

[52] U.S. Cl. ................................. 95/54; 95/55; 96/10; 96/13; 55/524; 55/DIG. 5

[58] Field of Search .............. 55/524, DIG.5; 95/45, 95/54, 55; 96/4, 11–13

[56] References Cited

U.S. PATENT DOCUMENTS

| | | | |
|---|---|---|---|
| 3,219,698 | 11/1965 | Halpern et al. | 260/576.6 |
| 3,241,298 | 3/1966 | Pierce | 96/11 X |
| 3,259,592 | 7/1966 | Fox et al. | 260/2.2 |
| 3,306,874 | 2/1967 | Hay | 260/47 |
| 3,306,875 | 2/1967 | Hay | 260/47 |
| 3,350,844 | 11/1967 | Robb | 55/16 |
| 3,510,387 | 5/1970 | Robb | 161/112 |
| 3,551,244 | 12/1970 | Forester et al. | 156/246 |
| 3,631,130 | 12/1971 | Klebe | 260/0.2 |
| 3,677,976 | 7/1972 | Miller et al. | 260/2 |
| 3,709,841 | 10/1972 | Quentin | 210/23 |
| 3,733,307 | 5/1973 | Cooper | 260/61 |
| 3,735,559 | 5/1973 | Salemme | 55/16 |
| 3,780,496 | 12/1973 | Wald, III et al. | 55/16 |
| 3,855,122 | 12/1974 | Bourganel | 210/23 |
| 3,875,096 | 4/1975 | Graefe et al. | 260/29.2 |
| 3,980,456 | 9/1976 | Browall | 55/158 |
| 4,035,337 | 7/1977 | Cooper et al. | 260/47 |
| 4,073,724 | 2/1976 | Chapurlat | 210/23 H |
| 4,155,793 | 5/1979 | Salemme et al. | 156/246 |
| 4,192,842 | 3/1980 | Kimura et al. | 264/298 |
| 4,230,463 | 10/1980 | Henis et al. | 96/12 X |
| 4,467,001 | 8/1984 | Coplan et al. | 427/434.6 |
| 4,468,501 | 8/1984 | Zampini et al. | 55/158 |
| 4,468,502 | 8/1984 | Malon et al. | 55/158 |
| 4,515,761 | 5/1985 | Plotzker | 96/12 X |
| 4,556,530 | 12/1985 | van der Sheer et al. | 96/12 X |
| 4,575,385 | 3/1986 | Brooks et al. | 96/13 |
| 4,602,922 | 7/1986 | Cabasso et al. | 55/158 |
| 4,626,585 | 12/1986 | Bartmann et al. | 528/212 |
| 4,650,501 | 3/1987 | Hiscock et al. | 55/26 |
| 4,673,717 | 6/1987 | Percec et al. | 525/390 |
| 4,686,131 | 8/1987 | Sugio et al. | 55/158 |
| 4,717,395 | 11/1988 | Chiad | 55/16 |
| 4,767,422 | 8/1988 | Bikson et al. | 55/16 |
| 4,818,387 | 4/1989 | Ikeda et al. | 55/158 |
| 4,866,099 | 9/1989 | Hendy | 210/650 |
| 4,880,440 | 11/1989 | Perrin | 55/16 |
| 4,909,810 | 3/1990 | Nakao et al. | 55/16 |
| 4,920,193 | 4/1990 | Han et al. | 528/171 |
| 4,933,082 | 6/1990 | Yamada et al. | 96/12 |
| 4,950,314 | 8/1990 | Yamada et al. | 55/158 |
| 4,954,143 | 9/1990 | Scott et al. | 55/16 |
| 4,971,695 | 11/1990 | Kauaka Mi et al. | 55/158 |
| 4,981,498 | 11/1991 | Bikson et al. | 55/16 |
| 4,990,165 | 2/1991 | Bikson et al. | 55/158 |
| 5,002,590 | 3/1991 | Friesen et al. | 55/16 |
| 5,009,678 | 4/1991 | Bikson et al. | 55/16 |
| 5,026,479 | 6/1991 | Bikson et al. | 210/321.8 |
| 5,049,167 | 9/1991 | Castro et al. | 96/13 X |

FOREIGN PATENT DOCUMENTS

| | | | |
|---|---|---|---|
| 263672 | 8/1989 | Czechoslovakia | D01F 6/66 |
| 0181850 | 5/1986 | European Pat. Off. | B01D 13/04 |
| 0191209 | 8/1986 | European Pat. Off. | 96/13 |
| 0254556 | 1/1988 | European Pat. Off. | 96/13 |
| 0277834 | 8/1988 | European Pat. Off. | B01D 13/04 |
| 0298531 | 1/1989 | European Pat. Off. | B01D 13/04 |
| 0394505 | 10/1990 | European Pat. Off. | B01D 69/04 |
| 0404416 | 12/1990 | European Pat. Off. | B01D 69/14 |
| 100917 | 5/1988 | Japan | B01D 53/22 |
| 137703 | 6/1988 | Japan | B01D 13/00 |
| 264102 | 11/1988 | Japan | B01D 13/00 |
| 305904 | 12/1988 | Japan | B01D 13/04 |

OTHER PUBLICATIONS

Journal of Membrane Science, vol. 64, "Formation of Asymmetric Hollow Fiber Membranes for Gas Separation," by Smid et al., pp. 121–127, 1991.

(List continued on next page.)

*Primary Examiner*—Robert Spitzer
*Attorney, Agent, or Firm*—Alvin H. Fritschler

[57] ABSTRACT

Multilayer composite membranes are produced in a one-step coating process that provides an interior gas separation layer and an external defect sealing layer.

20 Claims, No Drawings

OTHER PUBLICATIONS

Chemical Abstract No. 236575Y, vol. 112, No. 14 "Hollow Poly (Phenylene Oxide) Fibers and Process for Manufacturing Them," by Pechocova et al, p. 7, 1990.

Ind. Eng. Chem. Res., vol. 28, No. 6, 1989 "Analysis and Construction of Multilayer Composite Membranes to the Separation of Gas Mixture," by Kevin A. Lundy et al. (Reprinted from ISEC Research 1989, 28, 742).

Journal of Applied Polymer Science, vol. 20 (1976) "Sulfonated Polysulfone" by A. Noshay et al, pp. 1885–1903.

George Odian, "Principles of Polymerization," 2nd Edition, A. Wiley–Interscience Publication, John Wiley & Sons, pp. 22–23.

Journal of Applied Polymer Science, vol. 29, p. 4029, 1984.

"Research and Development of NS–1 and Related Polysulfone Hollow Fibers for Reverse Osmosis Desalination of Sea Water," PB 248,666; the Office Water Research and Technology Contract No. 14–30–3165, U.S. Dept. of the Interior, 1975.

"Research on Advanced Membranes for Reverse Osmosis," an annual report to the Office of Saline Water, U.S. Dept. of the Interior, Contract No. 14–30–2999, 1973.

Research and Development Progress Report No. 697, Contract No. 14–30–2627 to the U.S. Dept. of Interior, "Development of Polyphenylene Oxide Membranes," by Chludzinski et al, Jun. 1971.

Psaiination vol. 36, (1981), "Asymetric Reverse Osmosis and Ultrafiltration Membranes Prepared from Sulfonated Poly Sulfone," by Friedrich et al, pp. 39–62.

Journal of Applied Polymer Science, vol. 23, pp. 1509–1503, 1979.

"Research on In Situ–Formed Condensation Polymer for Reverse Osmosis Membranes,"Final Report to the Office of Water Research and Technology, U.S. Dept. of the Interior, Contract No. 14–34–001–6521, 1978.

"Development of a Composite Reverse Osmosis Membrane for Single Pass Sea Water Desalination," Final Report to the office of Water Research Technology, U.S. Dept. of the Interior, Contract No. 14–3-4–0001.7541, 1979.

PRODUCTION AND USE OF IMPROVED COMPOSITE FLUID SEPARATION MEMBRANES

BACKGROUND OF THE INVENTION

1. Field of the Invention

This invention relates to improved membranes for gas and vapor permeation. More particularly, it relates to improved composite membranes and preparation thereof.

2. Description of the Prior Art

Asymmetric and composite membranes capable of selectively separating one component of a gaseous or vapor mixture from another component are well known in the art. For practical commercial operations, such membranes must be durable and essentially free of imperfections, and must be capable of achieving an acceptable level of selectivity of the desired component, exhibiting a high permeation rate for the more rapidly permeable component of the gas or vapor mixture being processed.

Integrally skinned asymmetric membranes are currently used for numerous gas separation processes. Though manufacturing of essentially defect-free, ultra high flux asymmetric membranes is known in the art, for example, in the Pinnau et al. patent, U.S. Pat. No. 4,902,422, and the Sanders et al. patent, U.S. Pat. No. 4,772,392, it is known to be excessively difficult to produce such membranes. Thus, it is common practice in the art to subject asymmetric gas separation membranes to treatments that effectively eliminate defects that may be present in the ultrathin membrane separation layers. The Henis et al. patent, U.S. Pat. No. 4,230,463, addresses the problem of the presence of defects in asymmetric gas separation membranes and discloses the formation of multi-component membranes by applying a coating, typically a silicone rubber coating, to the surface of an asymmetric membrane made of a glassy polymer. Other defect-repair methods are disclosed in the Frisen et al. patent, U.S. Pat. No. 4,877,528, the Peinemann et al. patent, U.S. Pat. No. 4,746,333, and the Smith et al. patent, U.S. Pat. No. 4,776,436.

A different class of gas or vapor separation membranes are composite membranes that are produced by depositing a thin gas separation layer on a porous support. The material of the deposited layer, unlike that of the coating of the Henis et al. patent, determines the gas separation characteristics of the overall membrane structure. Such composite membranes are sometimes more advantageous than asymmetric membranes since they allow decoupling of the separation requirements from the engineering design requirements of the porous substrate. A variety of separation layer materials, support structures and membrane manufacturing methods are known in the art for producing composite membranes. Typical examples of composite gas separation membranes can be found in the Riley et al. patent, U.S. Pat. No. 4,243,701, the Browall patent, U.S. Pat. No. 3,980,456, and the Bikson et al. patent, U.S. Pat. No. 4,881,954. In such composite membranes, the separation layer may comprise a single membrane material or a blend of several materials.

For use in practical commercial operations, composite membranes must have the qualities referred to above, i.e., durability, freedom from imperfections, and an advantageous combination of selectivity and permeability characteristics. Often, however, the gas separation layer deposited on the surface of the porous support, i.e., substrate, does not fully meet the required needs. For instance, it may not be adequately resistant to the solvent effects of the gas/vapor mixture that can condense onto the membrane surface during the gas separation process. Furthermore, the separation layer may contain microscopic residual pores, pinholes or other defects i.e. imperfections that can preclude the attainment of the desired separation characteristics of the composite membrane. Such defects may exist for a variety of reasons, such as the presence of minute impurities in the membrane material, or as a result of damage to the thin separation layer during processing and handling. Thus, difficulties are sometimes encountered in the preparation of defect-free composite membranes for gas separation, particularly when using gas separation materials having very high cohesive energy density, such as polymeric materials that contain ionic groups. As a result, continued efforts are being expended to improve the structure and performance characteristics of composite membranes.

The above-indicated Browall patent discloses a process for patching breaches in a composite membrane in which a layer of sealing polymer material is placed over the surface of the composite membrane to cover particles embedded in the separation layer and to seal pinholes. The Bikson et al. patent, U.S. Pat. No. 4,767,422, discloses a method for repairing defects in composite membranes by post-treating with a volatile solvent, with or without the addition of minute amounts of additives, followed by evaporation of said solvent.

Multilayer composite gas separation membranes are also known in the art that are comprised of a porous support structure and a superimposed intermediate thin layer of high permeability material, with a thin layer of high selectivity, i.e., high separation factor, material further superimposed over the intermediate layer. The intermediate layer serves as a so-called gutter layer to facilitate the permeability of the membrane. It may also further seal some imperfections existing in the exterior gas separation layer. Such multilayer composite membranes of the prior art are complex in construction and require multiple processing steps in the preparation thereof, wherein each membrane layer is formed sequentially in separate film casting or coating steps.

The Cabasso et al. patent, U.S. Pat. No. 4,603,922, discloses the preparation of improved composite membranes of the gutter layer type. A thin layer of amino organofunctional polysiloxane is deposited on the surface of a highly porous polymer substrate, such as a polysulfone substrate, and the amino siloxane units are crosslinked with diisocyanate, with the resulting crosslinked polysiloxane being utilized as a gutter layer. A gas separation layer is coated on the gutter layer to provide a double-layer composite membrane that has a higher separation factor than the crosslinked polysiloxanes. Such an approach, while serving to enhance the permeability characteristics of the membrane and possibly serving to overcome the problems associated with the presence of imperfections in the thin, outer separation layer of such a double-layer composite membrane, nevertheless will be seen to be complex and costly to produce.

Surface active agents have been blended into coating compositions to improve adhesion of the coating layer to the substrate material and to improve the wettability of the substrate by the coating solution. For this purpose, very large quantities of said surface active agents have been employed on occasion. European Patent No. 92/04987 of Hoechst Celanse discloses the use of silicone surfactant for this purpose.

There remains in the art, therefore, a desire for further improvement in the preparation of composite membranes. In particular, there is a desire and genuine need for improved composite membranes capable of overcoming the problem of imperfections in the thin separation layer thereof, without the processing complexity and costs associated with the use of the double-layer composite membranes discussed above.

It is an object of the invention, therefore, to provide an improved composite membrane for gas and vapor permeation application.

It is another object of the invention to provide an improved process for the production of composite membranes overcoming the problems of imperfections in the separation layer thereof.

It is a further object of the invention to provide a multilayer composite gas separation membrane wherein the exterior layer more fully protects the inner gas separation layer from excessive damage during processing and handling.

With these and other objects in mind, the invention is hereinafter described in detail, the novel features thereof being pointed out in the appended claims.

SUMMARY OF THE INVENTION

The invention relates to multilayer composite membranes having at least two chemically distinct layers deposited on a porous substrate in a single one-step production process. The interior gas separation layer provides the primary gas separation characteristics of the membrane, and the separate exterior layer provides a protective, defect sealing function that enables the selectivity and permeability characteristics of the composite membrane to be realized in commercial practice.

DETAILED DESCRIPTION OF THE INVENTION

The objects of the invention are accomplished by the surprising discovery that multilayer composite membranes can be produced in a single coating step. The resulting multilayer composite membranes comprise at least two chemically distinct layers with the interior layer being a separation layer adjacent to the porous supporting layer or other substrate, and the outer or external layer forming a separate protective, defect sealing layer. The invention represents a highly significant advance in the art since it provides very simply and conveniently for the deposit of a very thin separation layer and a protective, defect sealing layer in a single processing operation.

In the practice of the invention, a substrate is coated in a single coating step, with a coating solution of a specific composition that enables the formation of the two distinct composite membrane layers referred to above. The coating solution comprises at least one film-forming polymeric material that provides the primary interior gas separation membrane layer adjacent to the substrate, and at least one additional material that forms the second, external defect sealing layer. The coating solution is deposited on the substrate by conventional means, such as the use of a coating applicator, dipping, spraying and the like. The coating solution used to deposit the composite layers is typically a dilute coating solution of not more than about 5% solids, frequently less than 2% solids weight by volume, in a solvent system that does not adversely affect the substrate.

The one-step coating process of the invention provides for the deposit on the substrate of a very thin, essentially defect-free gas separation composite membrane. The very thin coating has a thickness of less than about 1 micron ($\mu$) comprised of the two distinct layers referred to above, with the interior layer comprising 80% or more of the overall thickness of the thin coating, and with the exterior layer comprising 20% or less of the overall thickness thereof. The interior layer essentially determines the gas separation characteristics of the multilayer membrane of the invention and is formed from materials or blends of material that exhibit high gas separation characteristics. The exterior defect sealing layer comprises a material that is much more permeable than the interior separation layer material, e.g., generally at least 10 times, preferably at least 50 times, more permeable for the fast permeating component of a gas mixture than the interior separation layer material.

The coating solution used in the practice of the invention contains not more than about 5% weight by volume, typically less, of the polymeric material or blend of polymeric materials that form the interior layer or layers of the multilayer composite membrane. In some embodiments, such polymeric material will comprise less than 2% weight by volume of the coating solution, and less than 1% weight by volume.

The material used for the exterior, defect sealing layer of the invention will comprise not more than about 20% by weight of the total amount of the primary film-forming, polymeric gas separation material. Typically, said exterior layer material will comprise on the order of 5% by weight of said total, and, in some embodiments, less than about 2% and as low as about 1% thereof.

The material used to form the internal, primary gas separation layer can be a single polymeric material or a blend of polymers, which can be either a compatible or a noncompatible blend. The additive, supplementary layer forming material used to form the external layer is generally noncompatible with the primary layer forming material.

It is within the scope of the invention to employ the polymeric materials known in the art as having suitable gas separation characteristics for the interior membrane separation layer formed therefrom. Thus, the material of the inner layer may comprise polyesters, polycarbonates, polyimides, poly(phenylene oxides), cellulose derivative polymers, polyacrylates, polysulfones and the like, or mixtures thereof. Illustrative examples of polymers conveniently employed in the practice of the invention include polymethylmethacrylate, polyethylacrylate, cellulose acetate, sulfonated polymers, such as sulfonated polysulfone, sulfonated poly(phenylene oxide), including the salt form thereof, and mixtures thereof.

The additive materials employed in the coating solution to form the multilayered composite membranes of the invention have the following characteristics, (a) soluble or capable of being dispersed in the solvent system of the coating solution, and (b) have lower surface energy characteristics than the primary gas separation layer forming material. The mechanism by which the multilayer structure is formed is not completely known, but is believed to be primarily due to exclusion of the additive material to the external surface layer. Such exclusion would be advantageous on thermodynamic grounds since it lowers the surface energy of the overall system. It is possible that the low surface energy additive material in addition to forming an exterior protective layer also forms an intermediate layer between the substrate and the interior gas separation layer. The formation of such a layer could be also favored on thermodynamic grounds in specific embodiments. Such an intermediate layer formed of high permeability material would be analogous to a gutter layer known in the art and thus would provide known benefits. However, the formation of such an intermediate gutter layer is difficult to confirm by analytical means and its formation is postulated on theoretical grounds. Conventional surface tension, contact angle, and surface energy measurement techniques can be used to determine the surface characteristics of the primary gas separation layer forming material and the supplementary low surface additive material used to form the exterior, defect sealing layer. A useful method for determining the surface characteristics of the primary layer and the additive layer material is the contact angle measurement known in the art. The additive material should always have substantially lower surface energy characteristics than the primary gas separation layer forming material to facilitate the formation of the desired multilayer morphology. The additive material should have high gas permeation characteristics for the fast permeating component of a gas mixture, so as not to decrease the overall gas separation/permeation performance of the composite membrane.

In the carrying out of the practical commercial embodiments of the invention using presently known materials, the low surface energy additive that forms the protective external, defect sealing layer is a siloxane with a molecular weight of above 200, frequently above 1000, with a dimethylsiloxane unit content of at least 50 mol percent, preferably above 80 mol percent. The siloxane additive can further contain about 1 to 10 mol percent of active functional groups, such as double bonds, that can crosslink or can react with a crosslinking agent to form a crosslinking site. Frequently the siloxane additive is a functional siloxane, preferably a polyfunctional siloxane that contains active groups, such as amine and imine groups, carbonyl halides groups, isocyanate groups, epoxy groups, sulfonyl halides groups, thiols, etc., that are attached to siloxane molecule via a hydrocarbon moiety. Examples of such polyfunctional siloxanes are provided in U.S. Pat. Nos. 4,602,922 and 4,781,733. Following the formation of the multilayer membrane of this invention, the exterior siloxane layer that contains active functional groups can be optionally reacted with polyfunctional reactants, preferably polyfunctional siloxanes to crosslink the exterior defect sealing/protective layer via an interfacial polycondensation reaction. The process is typically carried out by coating the multilayer membrane of this invention with a dilute solution of a polyfunctional reactant that can react with the functional groups of the siloxane in the exterior sealing layer.

Those skilled in the art will appreciate that various changes and modifications can be made in the details of the invention, as herein described, without departing from the scope of the invention as set forth in the appended claims. Thus, it is within the scope of the invention, in some embodiments, to crosslink the exterior layer by subjecting the multilayer composite membrane to electron beam or ultraviolet radiation, or to accelerate crosslinking by suitable thermal treatment.

In certain embodiments of the invention, it will be desirable to form the interior layer of the multilayer composite membrane from a mixture of high separation factor materials, with such mixture forming an alloy. In any event, the material or materials used to form the interior separation layer will be selected, in particular applications of the invention, so as to provide an advantageous combination of selectivity and permeability characteristics in accordance with the overall performance requirements of a given application. If an incompatible blend of materials is used to form the interior gas separation layer, the result under certain circumstances can be the formation of multiple interior layers. These layers are referred to herein as the interior gas separation layer. A representative example of a mixture of high separation factor materials is a blend of polymethylmethacrylate and cellulose acetate.

A representative example of a high separation factor interior layer material is sulfonated poly(phenylene oxide), particularly in the lithium salt form. Another representative example of a high separation factor interior layer material is sulfonated hexafluro Bis A polysulfone, particularly in the lithium salt form. A desirable low surface energy additive for use therewith is an amino functional siloxane, for example, Genesee Polymer's GP-4 Silicone fluid, an amine functional silicone polymer with the following structure:

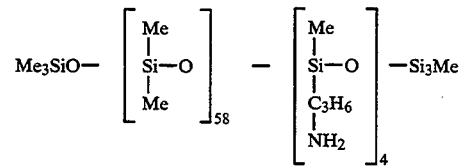

A composite membrane thereof is conveniently prepared by using a coating solution in which the concentration of sulfonated poly(phenylene oxide) is below 1% weight by volume and the concentration of the amino functional siloxane in said coating is less than 0.05% weight by volume.

The substrate portion of the multilayer composite membrane of the invention will be understood to provide support for the layers deposited thereon, but not to have a controlling effect on the gas/vapor separation performance carried out by the use of said membrane.

Any substrate produced from inorganic or organic materials can be used to prepare the composite membranes. However, it is desirable to employ natural and synthetic polymers, including but not limited to polymer blends and alloys, thermoplastics and thermoset polymers, as the porous substrate. Typical polymers are substituted or unsubstituted polymers which are selected from polysulfones; poly(styrenes), including styrene-containing copolymers such as acrylonitrilestyrene copolymers, styrene-butadiene copolymers, and styrene-vinylbenzylhalide copolymers; polycarbonates; cellulosic polymers, such as cellulose acetate, cellulose-acetate-butyrate, cellulose propionate, methyl cellulose, etc.; polyamides and polyimides; polyethers; poly(arylene oxides) such as poly(phenylene oxide); polyurethanes; polyesters (including polyarylates), such as poly(ethylene terephthalate), poly(alkyl methacrylates), poly(alkyl acrylates), etc.; polysulfides; polymers from monomers having alphaolefinic unsaturation other than mentioned above such as poly (ethylene), poly (propylene), poly (butene-1), poly(4-methyl pentene-1), polyvinyls, e.g., poly(vinyl chloride), poly (vinyl fluoride), poly (vinylidene) chloride), poly (vinylidene fluoride), poly (vinyl esters) such as poly (vinyl acetate) and poly(vinyl propionate); polyphosphazines; etc. However, the preferred substrate materials are polysulfones. The substrate may be in flat sheet form, tubular form, hollow fiber form or any other configuration. Those skilled in the art are aware of many methods for forming a substrate into different configurations. For instance, the hollow fibers can be produced by the well-known techniques described in the Journal of Applied Polymer Science, Vol. 23, 1509–1523, 1979, "Composite Hollow Fiber Membranes" by I. Cabasso, et al., and "Research and Development of NS-1 and Related Polysulfone Hollow Fibers for Reverse Osmosis Desalination of Seawater", PB 248,666 prepared for the Office of Water Research and Technology, Contract No. 14-30-3165, U.S. Department of the Interior, July 1975, incorporated herein by reference. As described in these references, the polysulfone hollow fibers can be prepared by dry/wet spinning method from a ternary solution of commercially available polysulfone in a solvent/nonsolvent mixtures. The well-known tube-in-tube jet technique may be used for the spinning procedure with water at about room temperature, being the outside quench medium for the fibers. The quench medium in the center bore of the fiber preferably is air. Quenching is followed by extensive washing to remove pore forming materials. Following the wash, the hollow fibers are dried at elevated temperature and water is removed by passing the hollow fibers through a hot air drying oven.

While various configurations can thus be employed, the composite membrane of the invention is conveniently in hollow fiber form. The substrate preferably has a high surface porosity and a narrow pore size distribution. The surface pores of the substrate are preferably less than 500 Å, frequently less than 200 Å. A preferred porous substrate is a polysulfone hollow fiber, although any other suitable substrate material can also be employed. The porous polysulfone hollow fibers typically range in outside diameter from 0.5 to 0.35 mm, with an inside diameter of from 0.33 to 0.15 mm. The polysulfone or other hollow fibers are coated with a coating solution as herein described, by conventional solution deposition techniques, to form the highly advantageous multilayer composite membranes of the invention.

The composite hollow fiber membranes of this invention are constructed into modules for gas and vapor separation applications. Any module configuration known in the art can be utilized that includes shell side feed and bore side feed permeators. An advantageous method of module construction with shell side feed introduction is described in U.S. Pat. No. 4,865,736. Another particularly advantageous method of module construction with bore side feed arrangement is described in U.S. Pat. No. 4,881,955. The membranes of this invention can be advantageously utilized in bore side feed permeators at cross membrane pressure differentials higher than prior art composite membranes.

In another embodiment, the invention comprises a multilayer composite membrane wherein the above indicated interior and exterior layers are formed on a thin layer, having a high gas permeability, which is formed on the substrate, as described above. This thin layer of exceptionally high gas permeability, is preferably made of a polymer having an oxygen permeability coefficient above $1 \times 10^{-8}$ cm$^3 \times$cm/cm$^2$.cmHg.sec. Preparation of such multilayer membranes is described in U.S. Pat. No. 4,602,922; European Patent Publication 181,850; and by K. A. Lundy and I. Cabasso in I&EC Research, 28, 742 (1989), "Analysis and Construction of Multilayer Composite Membranes for Separation of Gas Mixtures."

It is within the scope of the invention to further overcoat particularly fragile multilayer composite membranes, formed as herein described with a high intrinsic gas permeability material, for example above 50 Barrers with respect to oxygen, to form an additional external layer to further protect the multilayer composite membrane during handling and to further seal residual imperfections, if any, remaining therein. In such embodiments, it may be desirable to employ a high permeability material, such as polysiloxane, containing functional groups capable of reacting with the low surface energy additive material forming the exterior of said multilayer composite membrane.

The solvent employed in the preparation of the coating solution in the practice of the invention is one in which the separation layer material is soluble, and in which the additive material is soluble or can be dispersed, and which does not have a deleterious effect on the substrate structure. Representative examples of such solvents that can be used in coating polysulfone substrates includes alcohols, such as ethanol, methanol, methoxyethanol and the like, volatile organic acids, such as acetic acid, formic acid, and particularly their mixtures with alcohols and water, and hydrocarbons, such as hexane, cyclohexane and the like.

The invention is further described with reference to the following examples, which are presented for illustrative purposes only and should not be construed as limiting the scope of the invention as set forth in the appended claims.

EXAMPLE 1

Four hundred grams of commercial-grade poly(phenylene oxide) polymer in fine powder form having an intrinsic viscosity of 0.49 dl/g available from General Electric Company were refluxed with about two liters of methyl ethyl ketone under mechanical agitation to form a slurry. The slurry was then filtered, while still hot, through a coarse sintered glass filter, thereby recovering a partially purified polymer. The recovered polymer was further washed with about one liter of fresh methyl ethyl ketone. The polymer was again refluxed, filtered and washed as indicated above to obtain a further purified polymer. The thus purified polymer was washed until the resulting filtrate was clear and colorless. The polymer was dried to a constant weight at about 80° C. in a vacuum oven. The polymer yield was about 78%. The recovered polymer was found to have an intrinsic viscosity of 0.59 dl/g while the combined filtrate (extracted portion) was found to have an intrinsic viscosity of about 0.34 dl/g. The number average molecular weight (Mn), weight average molecular weight (Mw) and molecular weight distribution of the recovered polymer were determined by using gel permeation chromatography. The results are summarized in Table I.

TABLE I

| Sample | Intrinsic Viscosity dl/g | Mn | Mw | Mw/Mn |
|---|---|---|---|---|
| Commercial poly(phenylene oxide) polymer | 0.49 | 15,000 | 58,000 | 3.9 |
| Purified poly(phenylene oxide) polymer of Example 1 | 0.59 | 40,000 | 71,000 | 1.8 |

EXAMPLE 2

Four Hundred grams of the purified poly(phenylene oxide) polymer were dissolved under nitrogen atmosphere in 2.25 liters of chloroform (pretreated with a calculated amount of chlorosulfonic acid to remove residual water present in chloroform) in a resin kettle equipped with a high-speed stirrer. The solution was cooled to about $-20°$ C. To this cooled solution, 77.8 ml of chlorosulfonic acid dissolved in 317 ml of chloroform were added in five-minute intervals. Throughout the addition, the temperature of the solution was kept at about $-20°$ C. After the addition was complete, the temperature of the mixture was brought to 25° C. A rapid sulfonation took place with the formation of a smooth thin paste. The reaction mixture was stirred for one hour at 25° C. and then 2 liters of methanol were added to form a clear, yellow solution. This solution was subsequently mixed with about 101 grams of LiOH.H$_2$O and 102 grams of LiCl dissolved in about 800 ml of methanol/water mixture (methanol/water volume ratio was 60/40). The resulting mixture was concentrated to near dryness by rotary evaporation under vacuum. The residue dissolved in about 600 ml of methanol and diluted with about 1.8 liters of water. The mixture was dialyzed (10,000 MWCO molecular weight cutoff). The polymer was recovered from the dialyzed solution by rotary evaporation under vacuum and further dried at about 70° C. to a constant weight. The homogeneously sulfonated polymer in Li+ form had an intrinsic viscosity of about 0.59 dl/g measured in 0.05 M LiCLO$_4$ dimethylformamide solution and an ion exchange capacity of about 2.14 milliequivalents/gram of dry polymer in H+ form.

EXAMPLE 3

A composite hollow fiber membrane was prepared by coating porous polysulfone hollow fibers with a coating solution of the lithium form of sulfonated poly(phenylene oxide) polymer (SPPO-Li+ polymer) prepared essentially as described in Example 2. The coating solution of sulfonated poly(phenylene oxide) polymer was prepared by dissolving about 0.70 grams SPPO-Li+ polymer and about 0.007grams of amine functional silicone fluid (Genesee Polymer Corp., GP-4 in 100 cc of Reagent Alcohol (Fisher Scientific, HPLC grade). The coating solution was then filtered through a 1.5 micron glass filter and placed within a coating vessel. Polysulfone hollow fibers, which were dried in a dryer oven, were coated by passing the fibers through the coating solution that was contained in the coating vessel at a speed of about 3.3 m/min and then passed through a dryer oven prior to being taken up on a winder. The coated polysulfone hollow fibers were used to build a hollow fiber separator permeator that was tested for air separation utilizing compressed air at 1035 kPa and 22° C. The separation factor between oxygen and nitrogen was 5.7 and the permeation rate of oxygen was $2.2\times10^{-5}$ cm$^3$/cm$^2$.cmHg.sec.

Comparative Example 3A

A composite hollow fiber membrane was prepared by coating porous polysulfone hollow fibers with a coating solution of lithiated sulfonated poly(phenylene oxide) polymer essentially as described in Example 3, except that the GP-4 amine functional silicone fluid was not added to the coating solution.

The thus prepared composite membrane was tested for air separation as described in Example 3. The separation factor between oxygen and nitrogen was 4.0 and the oxygen permeation rate was $1.3\times10^{-5}$cm$^3$/cm$^2$.cmHg.sec. The determined separation factor was substantially inferior to the separation factor of the membrane in Example 3.

Comparative Example 3B

A composite hollow fiber membrane was prepared by coating porous polysulfone hollow fibers with a coating solution of lithiated sulfonated poly(phenylene oxide) polymer essentially as described in Example 3, except that Perenol S-4 (Henkel Corp.) was used as an additive instead of the GP-4 amine functional silicone fluid. The concentration of active surfactant ingredient of Perenol S-4 in the coating solution was essentially the same as for the GP-4 additive in Example 3, e.g., about 1 weight percent of the sulfonated poly(phenylene oxide) polymer content.

The thus prepared composite membrane was tested for air separation as described in Example 3. The separation factor between oxygen and nitrogen was 3.9 and the oxygen permeation rate was $1.6\times10^{-5}$ cm$^3$/cm$^2$.cmHg.sec. The determined separation factor was substantially inferior to the separation factor of the membrane in Example 3. The example demonstrates that Perenol S-4 surfactant additive that has low silicone content (4.2% Si by microanalyses) is not suitable as a low surface tension additive to produce improved membranes of this invention.

EXAMPLE 4

Flat sheet films were prepared from sulfonated poly(phenylene oxide) polymer prepared as described in Example 2. A film was cast from an 8 percent (weight by volume) solution of sulfonated poly(phenylene oxide) in reagent alcohol (Fischer Reagent Grade) that further contained 1 percent of amine functional silicone (GP-4) per weight of sulfonated polymer (film 2).

A comparable film was cast from reagent alcohol solution that did not contain amine functional silicon additive (film 1).

The films were cast on glass plates and dried in air overnight, followed by drying at 80° C. for 48 hours. The surface composition of the thus prepared films was studied by ESCA. ESCA analysis data were obtained at a 45° angle at a depth of 45 Angstroms. The results are summarized in Table II.

TABLE II

| | Composition (Atomic Percent) Elements | | | | | |
|---|---|---|---|---|---|---|
| | C | O | S | Li | Si | N |
| Expected composition for SPPO Li+ | 75.5 | 18.9 | 2.8 | 2.8 | — | — |
| Film 1 surface composition found | 71.1 | 21.6 | 4.8 | 2.3 | 0.2 | — |

TABLE II-continued

Composition (Atomic Percent)

| | \multicolumn{6}{c}{Elements} | | | | | |
|---|---|---|---|---|---|---|
| | C | O | S | Li | Si | N |
| Expected composition of functional silicone GP-4 | 51.3 | 23.4 | — | — | 23.8 | 1.5 |
| Film 2 surface composition found | 54.9 | 23.9 | 1.5 | 0.3 | 19.4 | — |

The data in Table 2 indicate that the surface composition of the film cast from the solution that contained functional silicone additive was close to the chemical composition of the silicone additive. The surface composition of the film cast from the solution that did not contain silicone additive was close to the expected composition of sulfonated poly(phenylene oxide). The data clearly indicate that a multilayer film was formed from the casting solution that contained functional silicone additive of this invention in a single-film casting step.

EXAMPLE 4A

The surface composition of composite hollow fiber membrane prepared as described in Example 3 was studied by ESCA. A sputter etching technique was used to obtain a surface chemical composition depth profile. The silicone concentration at the depth of 45 Angstroms was 7.4 atomic percent, the silicone concentration had decreased to 0.6 atomic percent at the depth of 125 Angstroms, and there was no detectable silicone at the depth of 225 Angstroms. These results demonstrate that a multilayer composite membrane comprised of an interior separation layer and an exterior defect sealing/protective layer has been produced in a single coating step.

EXAMPLE 5

Lithiated sulfonated hexafluoro Bis A polysulfone (F6 SPS-Li) was prepared from sulfonated hexafluoro Bis-A polysulfone (F6-SPS). The sulfonated F6-SPS polysulfone was prepared essentially as described in U.S. Pat. No. 4,971,695, incorporated herein by reference.

About 150 grams of F6-SPS polymer in H+ form (degree of substitution 0.87 and ion exchange capacity of 1.42 meq/g of dry polymer) were dissolved in 3 liters of reagent alcohol. To this solution was added an aqueous solution containing lithium hydroxide and lithium chloride which was prepared by dissolving about 9.2 grams (0.22 moles) of LiOh $H_2O$ and about 18.7 g (0.44 moles) of LiCl in 750 ml of water. After the mixture was vigorously stirred, an additional 5 ml of 0.2M LiOH was added to the F6-SPS solution to obtain a pH of about 9. The solution was stirred for 3 days at ambient temperature and the pH of the solution was adjusted to about 9 by the addition of 0.2M LiOH solution as needed. The solution was filtered, dialyzed to remove excess base and salts (membrane molecular weight cut-off 10,000), and dried first by rotary evaporation followed by drying in a vacuum oven for 2 days at about 70° C.

About 1.75 grams of F6-SPS Li and about 0.05 grams of an amine functional silicone (GP-4, Genesee Polymer Corp.) were dissolved in about 100 cc of reagent alcohol (Fischer Scientific, HPLC grade) to form a coating solution. The coating solution was then filtered through a 1.0 micron polypropylene filter and placed within a coating solution applicator. The composite membrane was prepared by passing the dry polysulfone hollow fibers through a coating solution at a speed of about 7 m/min, followed by drying in a dryer oven at temperatures ranging from about 80° to about 135° C. with a residence time of about 24 seconds.

A permeator was constructed from the composite membranes coated as described above. The preparation of the permeator and its subsequent operation to dehydrate water-saturated compressed air feed are described in U.S. Pat. No. 4,981,498, incorporated herein by reference.

The permeator was utilized to dry water-saturated compressed air streams at 1035 kPa and 23° C. at a purge ratio of 20 percent and feed flow rate of 904 scc-sec/$cm^2$ utilizing dry product purge. The water vapor permeability was $3.2 \times 10^{-3}$ $cm^3/cm^2$.cmHg.sec. In a separate air separation experiment, the oxygen permeability for the permeator was found to be $0.31 \times 10^{-6}$ $cm^3/cm^2$.cmHg.sec with an oxygen/nitrogen separation factor of about 7.1. The permeator thus exhibited an apparent $H_2O/N_2$ separation factor of about 73,000.

The invention provides a highly desirable advance in the membrane art. Composite membranes having separation layers adapted to the particular needs of a given gas or vapor separation application are especially suited to satisfying the growing desire for membranes in a wide variety of industrial operations. As the performance requirements of membranes become more stringent as the conveniences and benefits of membranes becomes more widely appreciated, the need for even thinner separation layers becomes more urgent. While such very thin separation layers serve to enhance the permeability characteristics of the membrane, this desirable result must be accomplished without adverse effect on the selectivity characteristics of the membrane. This becomes increasingly more difficult with ever thinner separation layers, making the need for an external defect sealing layer more essential. The invention, by enabling such external layer to be applied as part of a single coating step, reduces the complexity and cost of multilayer composite membrane production. The invention simplifies the coating procedure, particularly so as to enable the protective, external defect sealing layer to be applied and cured without the passing of the membrane over rollers in the course of the production procedure. This facilitates the protection of the very thin separation layer, further assuring against defects and enabling composite membranes to be produced more effectively at the advantageous combinations of selectivity and permeability required to satisfy the expanding requirements of industrial applications throughout the world.

We claim:

1. A process for separating a gas or vapor mixture comprising:
   (a) contacting a feed gas or vapor mixture with a multilayer composite membrane produced by the process comprising:
       (1) applying a thin layer of a coating solution to a substrate, said coating solution comprising not more than about 5% weight by volume of a polymeric gas or vapor separation membrane forming material in a solvent system, and not more than about 20% by weight, based on the weight of the membrane forming material, of at least one additive comprising polysiloxane; and (2) drying the thin coating layer on the substrate, thereby forming a multilayer composite membrane having at least one interior separation layer of the polymeric membrane forming material, that substantially determines the gas or vapor separation characteristics of the membrane, deposited on the substrate and an exterior protective layer of said at least one additive comprising polysiloxane over said at least one interior separation layer; and (b) withdrawing the more permeable component of the feed mixture from the multilayer composite membrane as permeate gas; and (c) separately recovering the less permeable component of the feed mixture from the multilayer composite membrane as non-permeate gas, whereby the exterior protective layer serves to protect said at least one interior separation layer from imperfections, thereby enhancing the selectivity permeability performance capabilities of the membrane.

2. The process of claim 1 in which said feed gas mixture is air, oxygen being the more permeable component thereof, with nitrogen being the less permeable component thereof.

3. The process of claim 1 in which the feed gas mixture comprises a hydrogen-containing stream, with hydrogen being the more permeable component thereof.

4. The process of claim 1 in which said at least one interior separation layer comprises 80% or more of the overall thickness of the coating and said exterior protective layer comprises 20% or less thereof.

5. The process of claim 1 in which said multilayer composite membrane comprises a hollow fiber membrane.

6. The process of claim 5 in which the feed gas or vapor mixture contacts the multilayer composite membrane so as to pass through the bores of said hollow fiber membrane from a feed end thereof, the permeate gas being recovered on the outer permeate side of the hollow fibers of said membrane, and the non-permeate gas being recovered from the bores of said hollow fibers at an exit end opposite the feed end thereof.

7. The process of claim 1 in which said membrane forming material is sulfonated polysulfone.

8. The process of claim 1 in which said membrane forming material is sulfonated poly(phenylene oxide).

9. The process of claim 8 in which said membrane forming material comprises the lithium salt form of sulfonated poly(phenylene oxide).

10. The process of claim 1 in which said at least one additive comprising polysiloxane contains reactive functional groups capable of crosslinking.

11. A process for the production of a multilayer composite membrane comprising:

(a) applying a thin layer of a coating solution to a substrate, said coating solution comprising not more than about 5% weight by volume of a polymeric gas or vapor separation membrane forming material in a solvent system, and not more than about 20% by weight, based on the weight of the membrane forming material, of at least one additive comprising polysiloxane; and (b) drying the thin coating layer on the substrate, thereby forming a multilayer composite membrane having at least one interior separation layer of the polymeric membrane forming material, that substantially determines the gas or vapor separation characteristics of the membrane deposited on the substrate and an exterior protective layer of said at least one additive comprising polysiloxane over said at least one interior separation layer, whereby the exterior protective layer serves to protect said at least one interior separation layer from imperfections.

12. The process of claim 11 in which said at least one interior separation layer comprises 80% or more of the overall thickness of the coating, and said exterior protective layer comprises 20% or less thereof.

13. The process of claim 11 in which concentration of the membrane forming material in the coating solution is less than about 2% weight by volume.

14. The process of claim 11 in which the concentration of said at least one additive in the coating solution is less than 5% by weight, based on the weight of the membrane forming material in the coating solution.

15. The process of claim 14 in which said concentration of said at least one additive is less than about 2% by weight, based on the weight of the membrane forming material.

16. The process of claim 11 in which said at least one additive comprises polysiloxane containing at least about 50% siloxane units.

17. The process of claim 16 in which said at least one additive comprises an amino functional polysiloxane.

18. The process of claim 16 in which said at least one additive contains reactive functional groups capable of crosslinking.

19. The process of claim 11 in which the membrane forming material comprises sulfonated polysulfone.

20. The process of claim 11 in which the membrane forming material comprises sulfonated poly(phenylene oxide).

* * * * *